Figure 1:
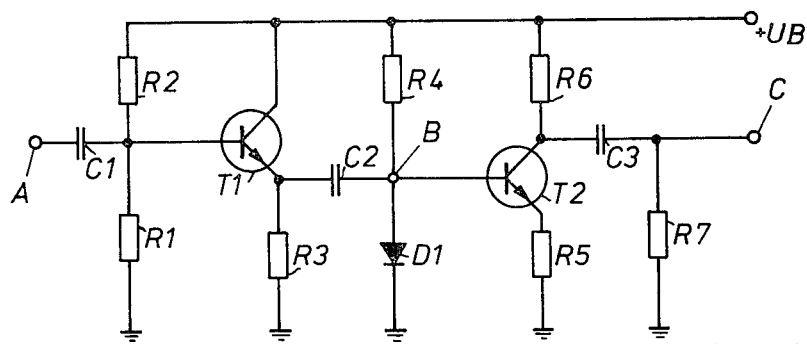

United States Patent [19]

Hansen

[11] 4,124,819
[45] Nov. 7, 1978

[54] DISTURBING SIGNAL DETECTION CIRCUIT

[75] Inventor: Jens Hansen, Hildesheim, Germany

[73] Assignee: Blaupunkt-Werke GmbH, Hildesheim, Germany

[21] Appl. No.: 777,335

[22] Filed: Mar. 14, 1977

[30] Foreign Application Priority Data

Mar. 30, 1976 [DE] Fed. Rep. of Germany ....... 2613470

[51] Int. Cl.² ............................................. H04B 1/10
[52] U.S. Cl. .................................. 325/479; 325/318; 307/237; 328/165
[58] Field of Search ............... 325/319, 348, 349, 473, 325/474–480, 482, 318; 307/237, 295; 358/165, 172, 167, 171; 328/165, 171

[56] References Cited

U.S. PATENT DOCUMENTS

| | | | |
|---|---|---|---|
| 3,126,514 | 3/1964 | Germain et al. | 325/478 |
| 3,240,956 | 3/1966 | Stone et al. | 307/237 |
| 3,248,658 | 4/1966 | Brown | 307/237 |
| 3,320,436 | 5/1967 | Sharples | 307/237 |
| 3,978,412 | 8/1976 | Freking | 325/478 |

Primary Examiner—John C. Martin
Assistant Examiner—Jin F. Ng
Attorney, Agent, or Firm—Flynn & Frishauf

[57] ABSTRACT

A signal being received and superimposed disturbance pulses are taken from a stage of the receiver where the signal is a periodic wave of constant amplitude or of amplitude varying at rates limited by a moderate modulation band, and the signal so picked up is AC-coupled to a diode clamp circuit, the clamp voltage then being amplified to produce a control output for a blanking gate. The forward voltage of the diode is insufficient to put the transistor of the following amplifier into its conducting condition, so that the transistor conducts only when a disturbance pulse extends beyond the limits of the envelope of the sinusoidal signal. By the use of a phase splitter, two identical clamp circuits may be operated to detect disturbance pulses of opposite polarity, and their outputs may be combined to provide blanking control pulses whenever a disturbance pulse of either polarity appears.

6 Claims, 12 Drawing Figures

DISTURBING SIGNAL DETECTION CIRCUIT

This invention concerns a circuit for detection of disturbance signals for operating the blanking circuit of a radio receiver having a blanking gate for blocking its signal reception path when a disturbance pulse is detected. Noise blanking circuits are commonly arranged to prevent a disturbance pulse picked up with a signal being received from getting from the demodulator of the receiver to the low frequency amplifier.

It is known to block momentarily a gate circuit located in the low-frequency signal path of a receiver in response to a disturbance pulse picked up in an FM demodulator and supplied to a disturbance voltage detector. During this momentary blocking, there is available to the low frequency amplifier only the voltage value present at a storage capacitor provided at an output of the gate circuit immediately before the occurrence of the disturbance voltage. In order to make it possible to suppress even the leading edge of the disturbance pulse, the low-frequency signal is supplied to the gate circuit through a delay line.

In the case of FM receivers, the disturbance voltage detectors are so designed that they respond to disturbance pulses that have frequency components lying above the frequency region of the useful frequencies that may be contained in the low-frequency signal being received through the detector. In this way, an undesired blocking of the gate by signals that it is desired to receive is prevented.

In the case of AM receivers, however, on account of the narrow band characteristic of the AM reception component, recognition of disturbance pulses lying above the useful frequency band as detected (sometimes referred to as the "base band" signal) is not possible in circuits following the demodulator. Disturbance pulses lying above the useful frequency band are therefore capable of being picked up only in the high-frequency portion of the receiver. Circuits have been proposed and used for recognition of disturbance pulses in this part of the receiver and are generally very expensive to incorporate in a receiver.

It is an object of the present invention to provide a circuit by which disturbances occurring in the high-frequency signal path of an AM receiver can be recognized without great expense or complication.

SUMMARY OF THE INVENTION

Briefly, a received signal containing disturbance pulses picked up from a signal path of the receiver is supplied over a clamping circuit having at least a diode and a capacitor to the control electrode of a transistor connected as an amplifier stage that is so connected to the clamping circuit that its amplifying properties are effective in the presence of pulse-type signals occurring in the signal path but are ineffective in the case of sinusoidal signals of steady amplitude, which is to say, of an amplitude that varies at most at the relatively slow rates of signal modulation.

The advantages obtained by the invention consist particularly in that few components are needed for the circuit, and the circuit has a high recognition reliability for disturbance pulses and is suitable for both AM and FM receivers.

Figures 2A, 2B, 2C:
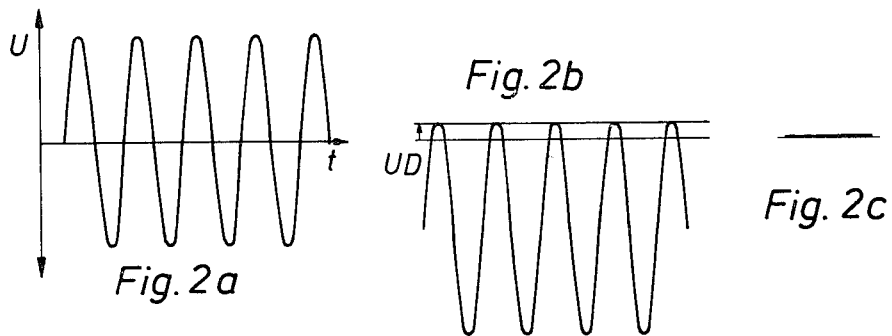
Figures 3A, 3B, 3C:
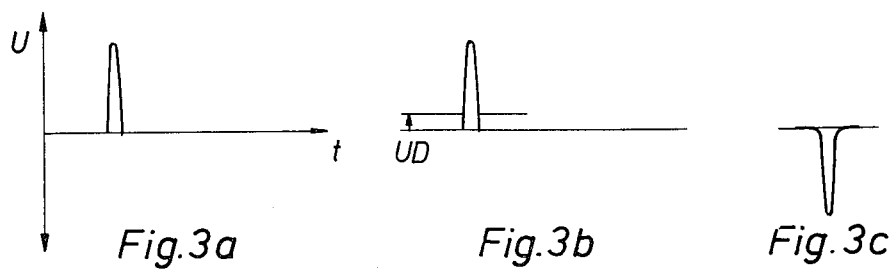
Figures 4A, 4B, 4C:
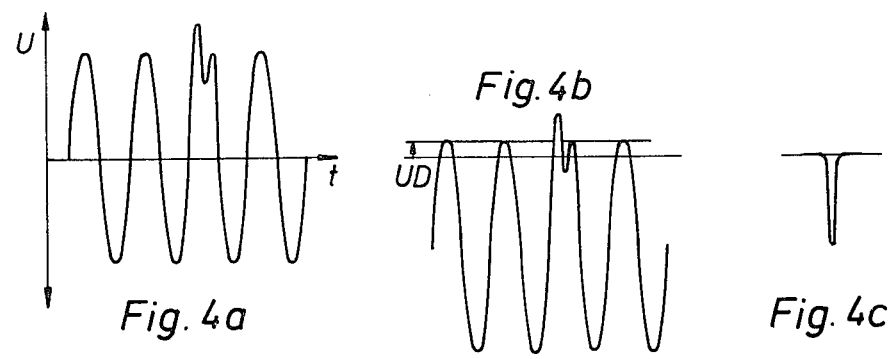
Figure 5:
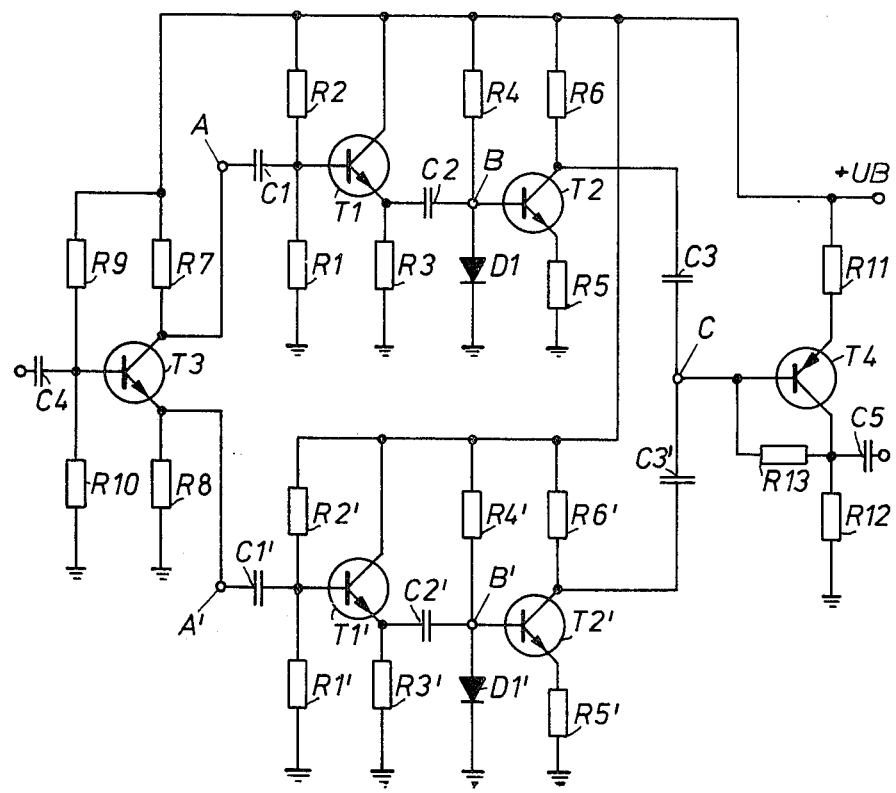
Figure 6:
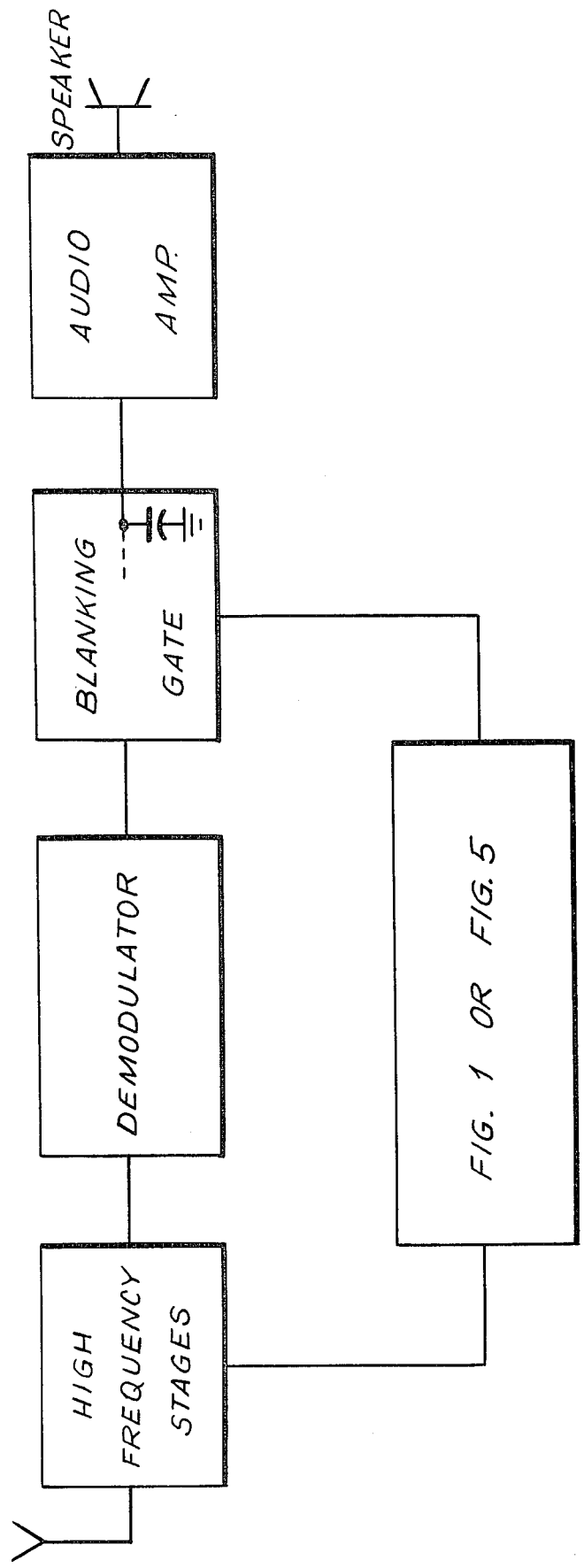

The invention is further described by way of an example with reference to the accompanying drawing, in which:

FIG. 1 is a diagram of a circuit for detection of disturbance pulses in accordance with the present invention;

FIG. 2a, FIG. 2b, and FIG. 2c are wave-form diagrams showing the course of voltage at points A, B and C respectively of FIG. 1 during reception of a sinusoidal signal;

FIGS. 3a, 3b, and 3c are wave-form diagrams relating to Points A, B and C during reception of a disturbance pulse;

FIGS. 4a, 4b, and 4c are wave-form diagrams relating to Points A, B and C of FIG. 1 during simultaneous reception of a sinusoidal wave and a disturbance pulse;

FIG. 5 is a diagram of a circuit for detection of disturbance pulses of both possible polarities; and FIG. 6 is a block diagram showing how the circuit of FIG. 1 or that of FIG. 5 may be used in a radio receiver.

As shown in FIG. 1, the input point A of the circuit is connected through a coupling capacitor C1 with the base of a first npn transistor T1, which is also connected to ground over a resistor R1 and to the positive voltage supply terminal UB over a second resistor R2. The collector of transistor T1 is connected directly to the positive voltage supply (terminal UB) and the emitter of that transistor is connected to ground over resistor R3 and to the base of a second npn transistor T2 through a coupling capacitor C2. The base of the second transistor T2 is also connected through a resistor R4 with the supply voltage terminal UB and to the anode of a diode D1, which has its cathode grounded to circuit or chassis ground potential. The common connection of the base of transistor T2, the anode of diode D1, one terminal of capacitor C2, and one of resistor R4, is identified as the circuit point B. The emitter of transistor T2 is connected to circuit ground potential through a resistor R5, and the collector of that transistor is connected to the supply voltage terminal UB over a load resistor R6 and to the output point C of the circuit through a coupling capacitor C3. The output circuit point C is also connected to chassis or circuit ground through a resistor R7.

Operation of the circuit

The first transistor T1 is connected as an emitter follower and passes signals picked up at the input point A to the clamping circuit constituted by the capacitor C2 and the diode D1. If a steady-state sinusoidal signal such as the one corresponding to the diagram of FIG. 2a is supplied to the input point A, the signal voltage at the base of the second transistor T2, shown in FIG. 2b, never rises above the value of the forward threshold voltage UD as a result of rectification by the diode. The diode is at once put into its blocking condition and remains therein. Since the diode threshold voltage is not sufficient to make the transistor T2 conducting, no signal appears at the collector of the transistor T2 and likewise at the output point C of the circuit (FIG. 2c). If now a pulse-type signal is supplied to the input point A as shown in FIG. 3a, the diode is momentarily put in the conducting condition and a signal shown in FIG. 3b appears at the circuit point B and an amplified signal, shown in FIG. 3c, appears at the output point C. If now there is supplied to the input point A of the circuit a signal of the kind shown in FIG. 4a, composed of sinusoidal oscillations and a superimposed disturbance pulse, the voltage at the circuit point B varies with time as shown in FIG. 4b. The sinusoidal oscillations are not amplified by the transistor T2. The positive pulse peak extending out above the envelope curve of the sinusoidal wave, however, does undergo amplification by the transistor T2. In consequence, a pulse of negative polarity appears at the output circuit point C that can be picked up to control a blanking gate.

For the recognition of disturbance pulses of both polarities, a circuit of the type of FIG. 5 is particularly well-suited. It contains two identical circuits of the type of FIG. 1, the respective inputs of which are fed in phase opposition by a phase aplitter circuit, and the outputs of the FIG. 1 circuits are connected together. The phase splitter circuit is composed in a known way of a transistor T3, resistors R7, R8, R9 and R10, and an input coupling capacitor C4. The common output just referred to is supplied to a further amplifier stage composed of a transistor T4, resistors R11, R12 and R13, and an output coupling capacitor C5. The transistor T4 is a pnp transistor hence complementary with respect to the transistors ahead of it, being provided in the circuit at this point in order to avoid changing the polarity of the output. A similar result could be reached with an npn transistor connected as an emitter-follower, but then no voltage amplification would be available in that stage.

The amplified disturbance pulses produced at the output of the circuit of FIG. 1 or at the output of the circuit of FIG. 5 can be used to operate a blanking gate interposed in the usual way between the demodulator and the low-frequency amplifier of a radio receiver, as illustrated by the block diagram of FIG. 6.

The received signal will not usually be of constant amplitude, at least in the AM case. The circuit of FIG. 1 will follow the amplitude in one direction by discharge of the capacitor C2 through resistor R4 between cycles of the sine wave and in the other direction by the addition of a small increment to the voltage UD on successive peaks of the sine wave. In the case of slow variations in amplitude, the transistor T2 would not be put into conducting condition, and in the case of faster variations of the signal amplitude resulting from rapid signal modulation, the voltage at the terminal C will show only small wobbles of a kind which can easily be prevented from operating a blanking circuit by the normal precautions against its false operation by small or slow voltage changes at its control input.

Although the invention has been described with reference to particular illustrative embodiments, variations are possible within the inventive concepts, as has already been indicated in a few particular respects.

I claim:

1. A disturbance pulse detection system for a radio receiver equipped with a blanking gate circuit in a signal path of the receiver, comprising:

means for picking up both received signals and disturbance pulses from a circuit in the receiver where the received signals have the form of a periodic wave of steady or gradually modulated amplitude, and for supplying said signals and pulses at at least one output outside the signal path of said receiver;

clamp circuit means connected to an output of said pick-up means, comprising a diode having a first terminal connected to circuit ground potential, a capacitor connected between an output of said pick-up means and a second terminal of said diode, for producing a clamped signal voltage in which recurring peaks of said signals do not substantially exceed the forward threshold voltage of said diode, and for producing a voltage peak, relative to said circuit ground potential, substantially exceeding said forward threshold voltage in response to a pulse-type disturbance, and means connected to the junction of said capacitor and diode for providing a forwardly-biasing current to said diode;

detecting amplifier means having a control circuit responsive to the output of said clamp circuit for selectively amplifying said voltage peaks substantially exceeding said threshold voltage, while producing substantially no response to voltages not substantially exceeding said threshold voltage, and means for applying the output of said detecting amplifier to a control terminal of said blanking gate so as to close said blanking gate during the presence of a voltage peak produced by said detecting amplifier.

2. A disturbance pulse detection system as defined in claim 1, in which said detecting amplifier means comprises a transistor having its base-emitter path in a circuit branch connected in parallel with said diode, and in which said means for providing a forwardly-biasing current to said diode is constituted by a resistance connected between the common connection of said diode and the base of said transistor and a voltage source of the same polarity as the polarity of voltage applied to the collector of said transistor.

3. A disturbance pulse detection system as defined in claim 2, in which said pick-up means includes a second transistor having an output electrode to which said capacitor is connected and having an input electrode connected to a second capacitor and connected through said capacitor to a signal path of said receiver.

4. A disturbance signal detection system as defined in claim 3, in which said second transistor is connected in an emitter-follower circuit and the output electrode of said second transistor is accordingly the emitter thereof.

5. A disturbance signal detection system as defined in claim 1, in which said pick-up means has two outputs, each of which provides an output voltage in phase opposition to the output voltage of the other, and in which said clamp circuit means is connected to a first of said outputs and in which a second clamp circuit means is connected to the second output of said pick-up means, said second clamp circuit means likewise comprising a diode having a first terminal connected to circuit ground potential, means for providing a forwardly-biasing current to said diode, and a capacitor connected between an output of said pick-up means and a second terminal of said diode, for producing an output voltage having the same response characteristics to an output of said pick-up means as in the case of said first clamp circuit means, and in which, further, a second detecting amplifier means is provided having a control circuit responsive to the output of said second clamp circuit means for selectively amplifying voltage peaks substantially exceeding the diode threshold voltage of said second clamp circuit means while producing substantially no response to voltages not substantially exceeding the diode threshold voltage of said second clamp circuit means, and in which, further, the outputs of both detecting amplifier means are connected together and to the control input of said blanking gate to provide thereto a combined signal responsive to disturbance pulses in said radio receiver of both possible polarities for closing said blanking gate to said pulses.

6. A disturbance signal detection system as defined in claim 5, in which in each of said clamp circuit means respectively connected with the two outputs of said pick-up means compromises a transistor having its base-emitter path in a circuit branch connected in parallel with said diode, and in which said means for providing a forwardly-biasing current to said diode is constituted by a resistance connected between the common connection of said diode and the base of said transistor and a voltage source of the same polarity as the polarity of voltage applied to the collector of said transistor.

* * * * *